No. 876,631. PATENTED JAN. 14, 1908.
F. C. GOFF.
APPARATUS FOR TREATING LIVE STOCK.
APPLICATION FILED JULY 15, 1907.
4 SHEETS—SHEET 4.
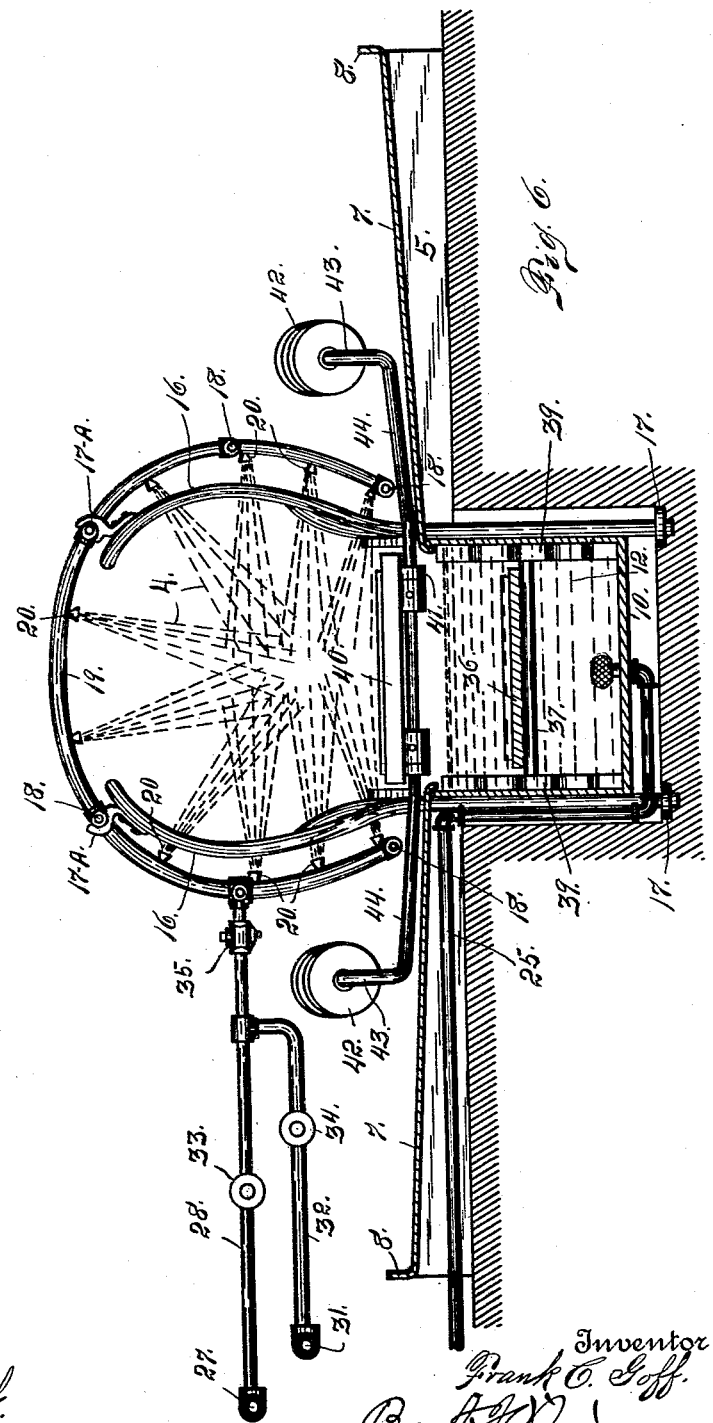
Witnesses
Otto E. Hoddick.
Dena Nelson.
Inventor
Frank C. Goff.
By A. J. O'Brien
Attorney

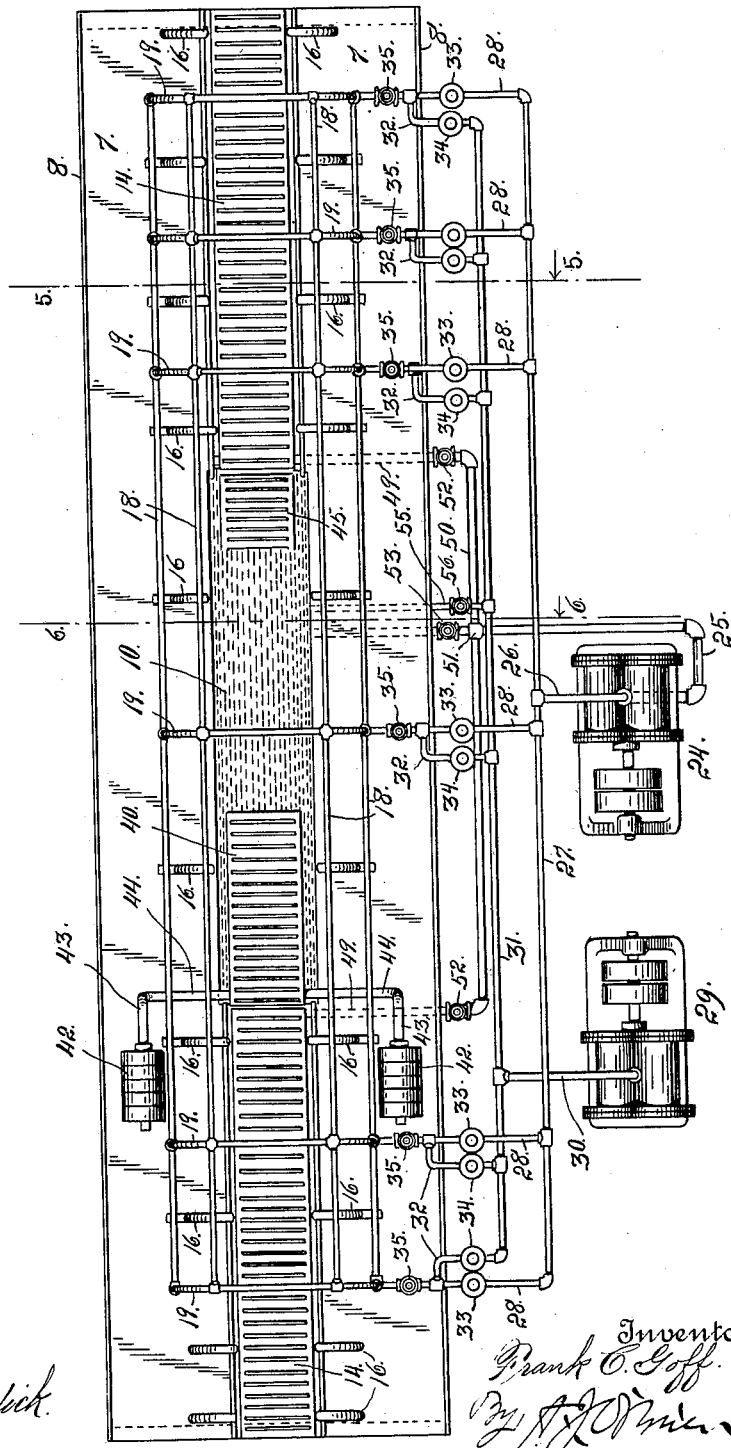

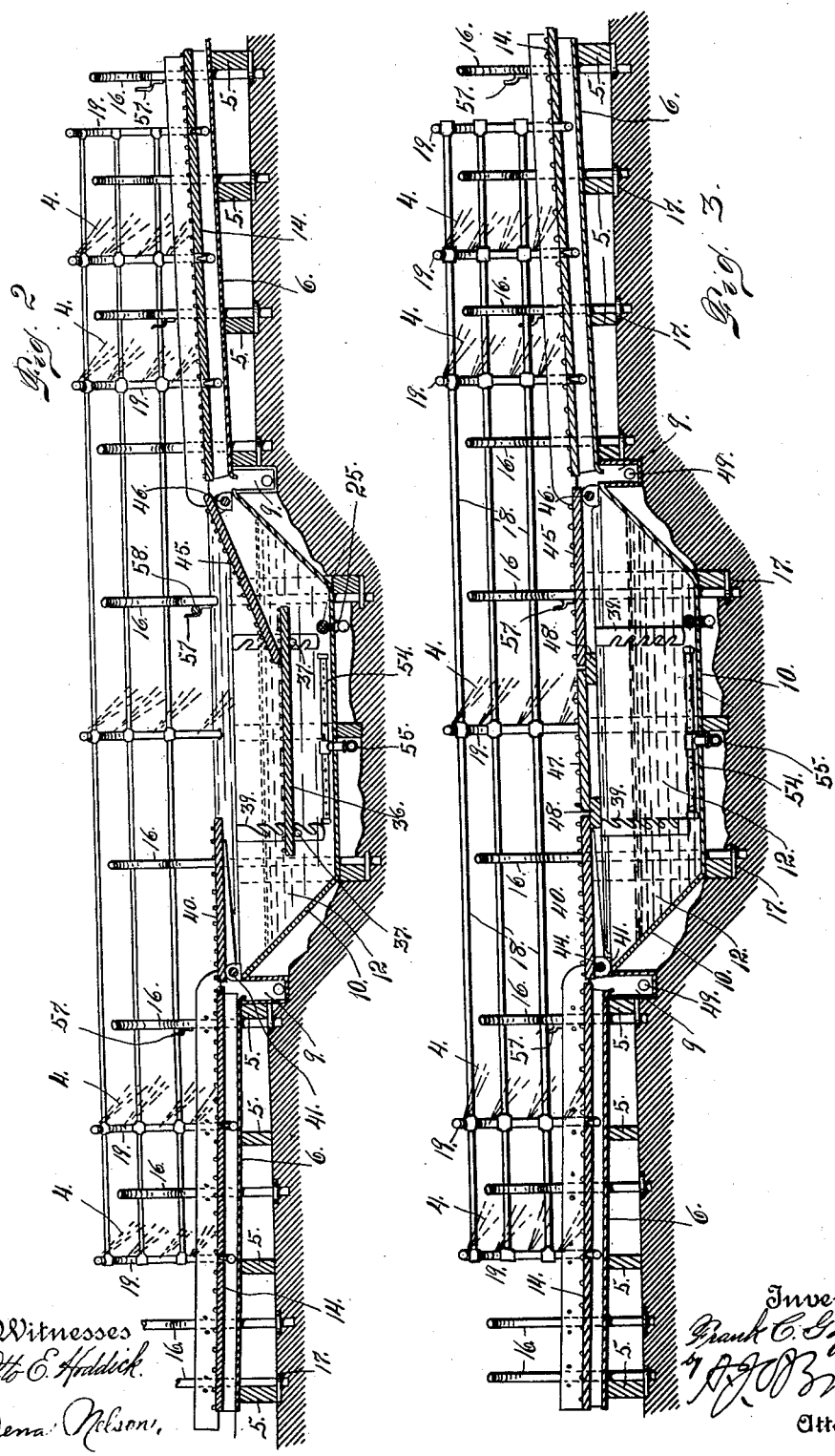

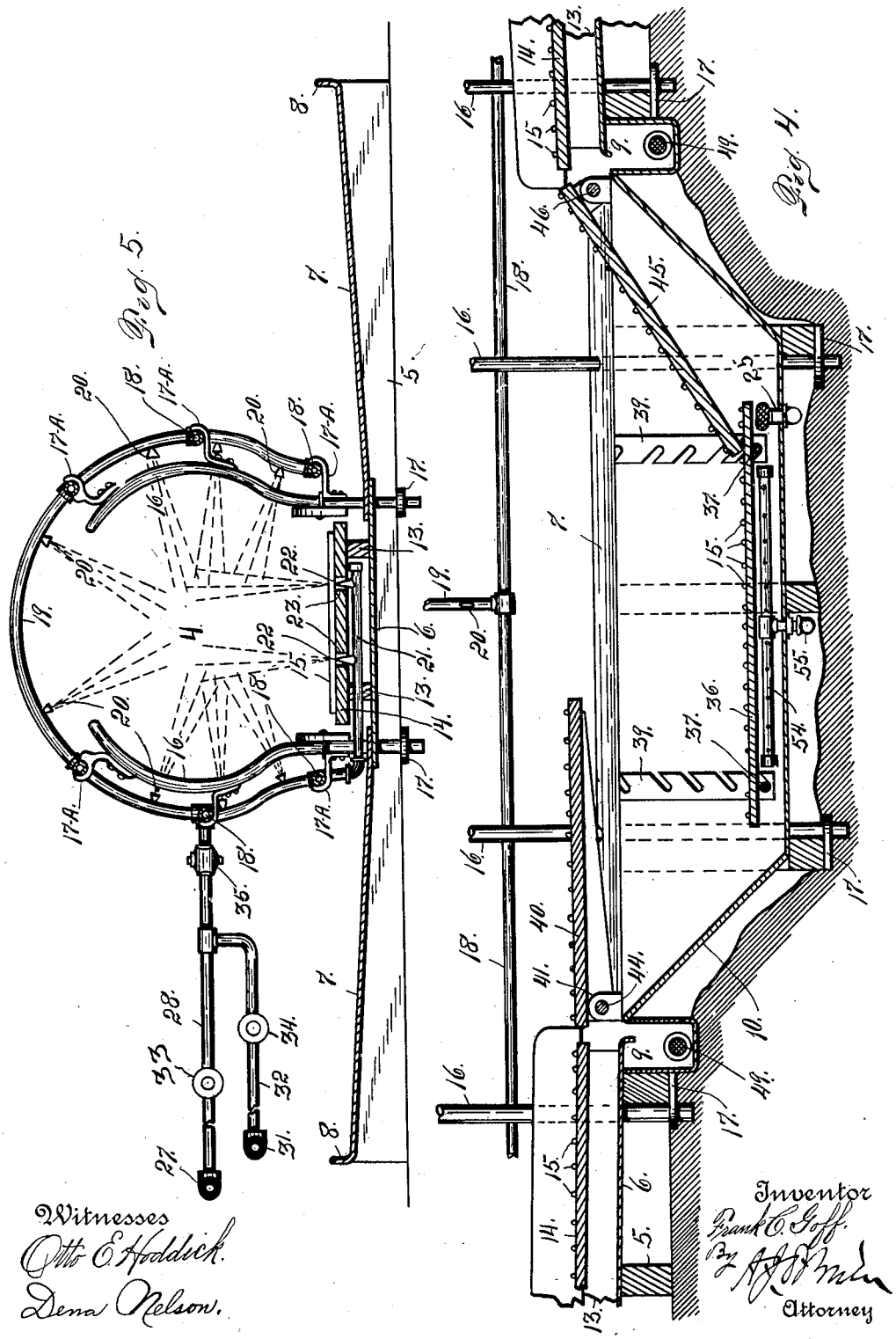

UNITED STATES PATENT OFFICE.

FRANK C. GOFF, OF DENVER, COLORADO.

APPARATUS FOR TREATING LIVE STOCK.

No. 876,631.   Specification of Letters Patent.   Patented Jan. 14, 1908.

Application filed July 15, 1907. Serial No. 383,923.

*To all whom it may concern:*

Be it known that I, FRANK C. GOFF, a citizen of the United States, residing in the city and county of Denver and State of Colorado, have invented certain new and useful Improvements in Apparatus for Treating Live Stock; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for treating live stock for the purpose of curing various skin diseases and for the purpose of destroying the various insects which are lodged in the hair or wool or which attach themselves to the animals.

A further object of the machine is the destruction of various disease germs as well as the eggs or larvæ of the aforesaid insects.

In my improved machine provision is made for subjecting the animal to treatment with a suitable liquid insecticide which may be applied to the animal by the use of spraying devices or by the use of spraying devices and dipping mechanism combined. To this end I provide means for partially immersing the animal whereby the limbs or the limbs and lower part of the body may be subjected to the treat of a mass of the liquid insecticide, while the upper portion of the body is subjected to treatment by the use of spraying devices.

In my improved machine provision is also made for subjecting the animal to treatment either by air or other gas or liquid as water, preparatory to the insecticide treatment, for the purpose of preparing the animals for the latter treatment and whereby the same is made more effective. The hair or wool of the animals generally contains a considerable quantity of loose dirt or foreign matter which it is practicable to remove by applying air or water under pressure.

In my improved machine provision is also made, after the insecticide treatment, for delivering gets of air or other gas under pressure, whereby the liquid insecticide is caused to penetrate the coat of hair or wool, and spread or distribute itself over the skin of the animal. By virtue of this finishing treatment, it becomes practicable to apply the liquid insecticide under less pressure than would otherwise be the case.

Where the liquid insecticide is delivered to the animal under considerable pressure, it is more or less injurious, with the result that the animals are rendered sore and lame after such treatment; whereas, where the subsequent or finishing treatment by the use of air under moderate pressure is employed, but very little pressure need be employed in applying the insecticide.

Generally speaking my improved apparatus consists of a sort of alley or skeleton runway through which the animals may pass in single file, suitable standards being used on opposite sides, connected in such a manner as to prevent the animals from escaping. On each side of this runway, is a platform downwardly inclined, for catching any of the insecticide, which during the treatment of the animals may pass beyond the immediate vicinity of the runway. In the central portion of this runway is formed a tank containing liquid insecticide, through which the animal may be caused to travel if desired; while mounted upon the standards above are spray nozzle for delivering the insecticide to the body of the animal in the form of spray. If desired this centrally located insecticide tank, may be covered and the animal treated by means of the sprays only.

Provision is also made in my improved apparatus for simultaneously subjecting the animal to the treatment of both air and liquid, the same being combined in suitable proportions, by the use of any desired mechanism.

Having briefly outlined my improved construction, I will proceed to describe the same in detail reference being made to the accompanying drawing in which is illustrated an embodiment thereof.

In this drawing, Figure 1 is a top plan view of my improved apparatus. Fig. 2 is a vertical longitudinal section of the same. Fig. 3 is a similar view showing the centrally located insecticide tank, covered so that the animals may pass through without entering the tank. Fig. 4 is a view similar to Fig. 2 but shown on a larger scale, the extremities of the construction being broken away to make room on the sheet. Fig. 5 is a cross section taken on the line 5—5 Fig. 1, the parts being shown on a larger scale. Fig. 6 is a section taken on the line 6—6 Fig. 1, on the same scale as Fig. 5.

The same reference characters indicate the same parts in all the views.

Let the numeral 5 designate suitable sills or transversely located beams, which form a support for bottom plates 6 located at the opposite extremities of the apparatus and inclined downwardly longitudinally from said extremities. Extending outwardly on opposite sides of these plates 6, are platforms 7 whose outer edges are upturned to form flanges as shown at 8. From these flanges the platforms are downwardly inclined and overlap the plates 6, whereby any liquid which passes beyond the boundaries of the said plates, is returned to the plates and caused to pass downwardly into troughs 9, located at the opposite extremities of the central tank 10 containing the liquid insecticide 12. A portion of the liquid is also returned by the platforms directly to the tank.

Above the plates 6 and resting upon longitudinal sills or beams 13 are located front and rear platforms 14 which are downwardly inclined slightly in the direction of the tank 10. These platforms are provided with transverse ribs 15, to prevent the animals from slipping while passing through the runway.

The beams 5 provide means for the support of stanchions 16 whose extremities as shown in the drawing are provided with plates 17 which are secured to the said beams. These stanchions project upwardly on opposite sides of the platforms 14 and are preferably outwardly curved intermediate their extremities. They are provided with outwardly projecting brackets 17ª, which form the support for longitudinally disposed bars 18 which support transversely disposed bow-shaped pipes or conduits 19 which extend over the runway or space between the stanchions. These bow-shaped members 19 are provided with spray nozzles 20 from which the fluid whether in the form of gas or liquid, may be delivered to the animals passing through the runway. Each conduit member 19 also has a portion 21 extending underneath the platform 14 and provided with upwardly projecting nozzles 22 which pass through openings 23 formed in the platform 14, whereby the sprays or jets of gas or liquid, may be delivered to the lower portions of the bodies of the animals. The bow-shaped nozzle-holding conduits, may be located at any desired intervals along the runway.

Let the numeral 24 designate a pump adapted to remove the liquid insecticide 12 from the tank 10, by way of a pipe 25, and deliver it by way of a pipe 26, to a longitudinally disposed conduit 27, from which branch conduits 28 lead to the bow-shaped conduit members 19 for supplying the spray nozzle. As a large portion of the liquid from these nozzles is returned again to the tank through the instrumentality of the mechanism heretofore described, it will be seen that the pump 24 causes the liquid to travel in an endless circuit.

Let the numeral 29 designate an air pump provided with an exit pipe 30 leading to a longitudinally disposed conduit 31, from which lead branch pipes 32, to each pipe 28, for the purpose of mixing air with the liquid when desired. Each pipe 28 is provided with a valve 33 located between the liquid conduit 27 and the point where the air pipe 32 enters the pipe 28. By means of this valve, the liquid may be cut off entirely from any bow-shaped member, whereby the animals are subjected to the action of air only, either for cleansing purposes at the front end of the apparatus and preparatory to subjecting them to the liquid insecticide treatment; or at the rear extremity of the apparatus after treatment by the insecticide, for the purpose of causing an even distribution of the liquid insecticide over the skin of the animal, and also for the purpose of quickly removing all superfluous liquid.

The branch air pipe 32 is also provided with a valve 34 interposed between the conduit 31 and the pipe 28. By means of this valve the air may be entirely shut off from the pipe 28, whereby liquid only is delivered to the bow-shaped conduits. The valves 33 and 34 are also reducing valves whereby the pressure of both the air and liquid may be regulated at will. By virtue of these reducing valves, it becomes practicable to use the air and liquid together, since the pressure of both fluids may be easily made equal by the use of said valves, whereby the air and liquid will work in harmony. If either of these fluids was under more powerful pressure than the other, the fluid under the greater pressure, would act on the fluid under less pressure, and prevent the passage thereof. It is therefore important that the pressure of the two fluids working in harmony shall be equal or approximately equal.

Each pipe 28 is provided intermediate the point where the air pipe 32 enters the same and the bow-shaped conduits, with a valve 35 which may be utilized to cut off the passage of fluid to the bow-shaped conduits whenever desired. Having once adjusted the pressure-reducing valves 33 and 34, no further attention need be given these valves during any particular spraying operation, since the passage of the fluid to the bow-shaped conduits may be completely controlled by the use of the cut-off valves 35.

Within the tank 10, is located a vertically adjustable platform 36, the height of which as shown in the drawing, may be regulated by placing supporting bars or rods 37, in different positions in the notched or recessed hangers 39 located at the opposite sides of the tank. By virtue of the adjustability of this platform, the depth of liquid through which the animals are caused to wade, may be regulated at will to correspond with the height of the animal. This platform 36 is also provided with transverse ribs 15 the same as the platforms 14.

Mounted above the forward end of the tank 10, is an auxiliary platform 40 normally supported in the plane of the adjacent platform 14, by weights 42 respectively connected with crank arms 43 formed on the opposite extremities of a rock shaft 44 to which the platform 40 is made fast, the said shaft being journaled in the sides of the tank 10 whereby the said platform is hinged to move downwardly with the weight of the animal, the weights 42 being so adjusted as to bring about this result. For this purpose each weight 42 is composed of any desired number of readily detachable and replaceable sections. This hinged platform is an important feature, since by virtue thereof, the animal will readily walk thereon and move downwardly by his own weight into the liquid of the tank; whereas if it were not for the platform, much difficulty might be experienced in causing the animal to walk unassisted into the tank. As the platform moves downwardly, to the inclined position, the animal will pass immediately to the adjustable platform member 36, and then pass on to a second inclined platform 45 hinged to the tank as shown at 46. The inner extremity of this last named platform normally rests upon the platform member 36.

When it is not desired to partially immerse the animals in the liquid of the tank 10, the two hinged platforms 40 and 45, may be raised to the position shown in Fig. 3, and an intermediate platform member 47 placed in position and supported by suitable cross pieces 48 resting upon the opposite sides of the tank. In this case the platform 36 may either be left in the tank or removed as may be desired. By virtue of this last named construction, the animals walk over or above the liquid in the tank and they are treated by the fluid jets from the spray nozzles alone.

When the same liquid is used in spraying the animals on both end platforms 14 as that contained in the tank 10, the liquid in the troughs 9 is taken therefrom through the action of the pump 24, by virtue of two pipes 49, which communicate with the said troughs and lead to a longitudinal pipe 50 which is connected with the induction pipe 25 as shown at 51. If it is desired to pump the liquid from the tank and not from the troughs, valves 52 located in the pipes 49 are closed; while if it is desired to pump from the said troughs and not from the tank, a valve 53 located in the pipe 25 between the pipe 50 and the tank, is closed; while if it is desired to pump from the troughs and tank simultaneously, all of the said valves are left open.

In the bottom of the tank 10, is located a perforated pipe 54 adapted to receive air from the longitudinal air conduit 31, by way of a branch pipe 55. In this last named pipe is located a valve 56 which if left open, will allow the air to pass freely through the pipe 54, with the result that the liquid in the tank will be agitated, whereby the beneficial results thereof on the animal may be enhanced.

From the foregoing description the use and operation of my improved apparatus will be readily understood. For the purpose of this description, it will be assumed that the animals enter the runway at the left referring to Figs. 1 to 4 inclusive. As they pass along the front platform 14, they are subjected to the action of fluid jets 4, from the jet nozzles 20 of the bow-shaped conduits, said nozzles being arranged to spray the entire body of the animal. These jets may be either of air alone; liquid insecticide alone; or air and liquid combined as desired. If air only is used the valves 33 of the pipes 28 leading to the forwardly located bow-shaped conduits 19, will be closed; if liquid only is used, the valves 34 of the branch air pipes 32 will be closed, while the aforesaid valves 33 will be left open; while if air and liquid combined, are used the valves 33 and 34 will both be left open.

If the apparatus is in the shape shown in Figs. 1 and 2, the animal after passing over the forwardly located platform 14, will pass to the hinged platform 40, which by virtue of the gravity of the animal will move downwardly carrying him into the liquid insecticide 12 after which he will pass over the horizontal platform 36, to the inclined platform 45 and thence up the same to the rearwardly located platform 14. While passing through the tank, the lower part of the animal's body is immersed in liquid insecticide, while its upper portion is drenched by jets 4 from the bow-shaped conduit located above the tank. After reaching the rearwardly located platform 14, the animal is again subjected to fluid sprays or jets, composed either of liquid insecticide alone, air alone or air and liquid combined as may be desired.

If the apparatus is in the form shown in Fig. 3, the animal will pass over the top of the tank 10, and his treatment will be from the spray jets alone.

The pump 29 which is described as an air pump, may also be employed as a liquid pump, in which event it may be used to deliver water to the spraying devices either alone or in combination with the liquid insecticide. In case the insecticide is of greater strength than is desired, it may be advantageously diluted with water by using the pump 29 for mixing water therewith in the same manner as the mixing of air with the insecticide as heretofore explained. It may also be stated that by mixing air with the insecticide, a less quantity of the latter may be used than where the insecticide is used alone. The mixing of the air with the insecticide within the conduits and before its escape from the spraying devices, results in a very fine division of the liquid or an efficient atomizing of the latter in such a manner that its function to the animals is more effective than where the liquid is used alone.

The stanchions 16 are preferably provided at intervals with hook-shaped brackets 57, forming supports for stop bars or rods 58, which may be dropped into the brackets from above or run through transversely from one stanchion to another, for the purpose of stopping the travel of the animal at any point of the runway if for any reason this should become necessary. It may sometimes happen that it will be desirable to stop the progress of an animal through the runway at some particular point, for the purpose of giving him additional treatment. In this event a bar 58 may be used as aforesaid.

Having thus described my invention, what I claim is:

1. An apparatus for treating live stock, including a skeleton runway for the passage of the animals, spraying devices arranged adjacent thereto, and platforms extending outwardly from the runway for catching the liquid which flies beyond the limits of the runway.

2. An apparatus for treating animals, including a skeleton runway, spraying devices mounted adjacent thereto, and liquid collecting platforms extending beyond the limits of the runway.

3. An animal treating apparatus including a skeleton runway, means arranged along the runway for delivering fluid jets thereto, and means extending laterally beyond the sides of the runway for collecting the liquid splash.

4. An animal treating apparatus including a skeleton runway, means arranged along the runway for delivering fluid jets thereto under pressure, and means extending laterally beyond the sides of the runway for collecting the liquid splash.

5. An animal treating apparatus including a skeleton runway, and bow-shaped conduits extending over the runway and equipped with nozzles arranged to deliver fluid jets into the runway, and means extending laterally beyond the sides of the runway for collecting the liquid splash, substantially as described.

6. An animal treating apparatus, including a skeleton runway, conduits encircling the runway and equipped with nozzles adapted to deliver fluid jets into the runway in all directions, and means extending laterally beyond the runway for collecting the liquid splash.

7. Apparatus for treating live stock, including a runway having openings formed in its bottom, spray nozzles projecting into said openings and adapted to deliver fluid upon the animals from below, and means extending laterally beyond the runway for collecting the liquid splash incident to the use of the apparatus, substantially as described.

8. Apparatus for treating live stock, including a runway provided with a fluid conduit encircling the runway transversely and provided with spray nozzles arranged to deliver fluid jets into the runway in all directions, and means extending laterally beyond the runway for collecting the liquid splash due to the use of the apparatus, substantially as described.

9. A live stock runway, composed of stanchions arranged along the sides of the runway, and transversely arranged fluid conduits encircling the runway and mounted on the stanchions, said conduits being provided with nozzles arranged to deliver fluid jets into the runway, substantially as described.

10. Apparatus for treating live stock, comprising a runway provided at either end with spraying devices, and having an intermediately located liquid-containing tank through which the animals must pass in going through the runway, and means extending laterally beyond the runway for collecting the liquid splash incident to the use of the apparatus.

11. A runway for the treatment of live stock, having a liquid-containing tank through which the animals must pass and in which they are partially immersed, spraying devices arranged adjacent the runway for delivering fluid jets thereinto for the purpose set forth, and means extending laterally beyond the tank for collecting the liquid splash due to the use of the apparatus.

12. A runway for the treatment of live stock, the said runway being equipped with liquid spraying devices and a liquid-containing tank, a hinged platform weighted to normally maintain it in the plane of the bottom of the runway, the said platform being adapted to move downwardly into the tank under the weight of the animal, and means extending laterally beyond the runway for collecting the liquid splash, substantially as described.

13. Apparatus for the treatment of live stock, comprising a runway, spraying devices mounted adjacent the runway and adapted to deliver fluid jets thereinto, and suitable means for delivering to the spraying devices air and liquid under pressure and mixed in suitable proportions, and mean extending laterally beyond the runway for collecting the liquid splash, substantially as described.

14. Apparatus of the class described, comprising a runway, a liquid-containing tank centrally located in the runway, platforms located in the runway at the opposite ends of the tank, spraying devices mounted adjacent the runway, plates located underneath the bottom of the runway and inclined downwardly towards the tank, troughs at the lower extremities of these plates, and liquid-collecting platforms arranged on opposite sides of the runway and downwardly inclined toward the latter, whereby the discharge therefrom is delivered to the said plates and the liquid-containing tank, substantially as described.

15. Apparatus for the treatment of live stock, including a runway equipped with liquid-spraying devices, a liquid-containing tank located therein, a vertically adjustable platform located in the tank to accommodate the depth of immersion to animals of varying size, and means extending laterally beyond the runway for collecting the liquid splash, substantially as described.

16. Apparatus for the treatment of live stock including a runway equipped with liquid-spraying devices, a liquid-containing tank located therein, a weight supported platform located at one extremity of the tank and hinged to move downwardly thereinto under the weight of the animal, a vertically adjustable platform located in the tank and adapted to be engaged by the lower extremity of the hinged platform, a second hinged platform located at the opposite extremity of the tank and also adapted to engage the vertically adjustable platform, and means extending laterally beyond the sides of the runway for collecting the liquid splash, substantially as described.

17. Apparatus for the treatment of live stock, comprising a runway, spraying devices mounted thereon, a centrally located liquid-containing tank, liquid-collecting platforms extending outwardly from the runway but downwardly inclined thereto for returning the liquid splash to the tank, and means for removing the liquid from the said tank and delivering it to the spraying devices under pressure, substantially as described.

18. Apparatus for the treatment of live stock, comprising a runway, spraying devices mounted thereon, troughs arranged adjacent the runway, liquid-collecting platforms extending beyond the runway and downwardly inclined to return the liquid splash to the troughs, and means for removing the liquid from the troughs and returning it to the spraying devices, substantially as described.

19. Apparatus for the treatment of live stock, comprising a runway, spraying devices mounted adjacent thereto and adapted to deliver fluid jets thereinto, a centrally located liquid-containing tank, troughs arranged at the opposite extremities of the tank, means extending laterally beyond the sides of the runway for collecting the liquid splash and returning it to the tanks and troughs, and means for removing the liquid from the tanks and troughs and returning it to the spraying devices under suitable pressure, substantially as described.

20. Apparatus for the treatment of live stock, including a runway equipped with liquid-spraying devices, a liquid-containing tank located in the runway and extending below the bottom of the same, a hinged platform located at one extremity of the tank, counterbalance means for supporting the said platform in position to form a continuation of the bottom of the runway, the said platform being adapted to move downwardly into the tank under the weight of the animals, and means extending laterally beyond the sides of the runway for collecting the liquid splash, substantially as described.

21. Apparatus for the treatment of live stock, including a runway equipped with liquid-spraying devices, a liquid-containing tank located therein and extending below the bottom of the runway, and hinged platforms located at the opposite extremities of the tank, one of the said platforms normally projecting into the tank and occupying an inclined position, counterbalance means for normally supporting the other hinged platform in position to form a continuation of the bottom of the runway but arranged to move downwardly into the tank under the weight of the animal, and means extending laterally beyond the runway for collecting the liquid splash, substantially as described.

22. Apparatus for treating live stock, including a runway, spraying devices arranged adjacent the runway for delivering fluid jets thereinto, a liquid-containing tank located intermediate the extremities of the runway and extending below the bottom of the runway, a platform located in the tank and supported above the bottom of the same, and a liquid-agitating device located below the said platform, substantially as described.

23. Apparatus for the treatment of live stock including a runway, a liquid-containing tank located in the runway, a perforated pipe located in the lower part of the tank, and means for delivering air under pressure to the said pipe for the purpose of agitating the liquid in the tank, substantially as described.

24. Apparatus for treating live stock including a runway, conduits arranged along the runway and equipped with spraying devices, means for delivering air under pressure to said conduits, means for delivering liquid under pressure to the same conduits simultaneously with the delivery of the air, pressure-reducing valves, means extending laterally beyond the sides of the runway for catching the liquid splash, and cut-off valves for controlling the passage of liquid to the conduits.

25. An animal spraying apparatus, including spraying devices arranged to direct jets of fluid against the animals, in combination with supply conduits provided with pressure-reducing valves, and means extending laterally only beyond the spraying devices for collecting the liquid splash.

26. Apparatus for the treatment of live stock, including a liquid-containing tank through which the animals pass and in which they are partially immersed, spraying devices arranged for directing jets of fluid against those portions of the animals not immersed during such passage, and means extending laterally beyond the liquid-containing tank for collecting the liquid and returning it to the tank, substantially as described.

27. Apparatus for the treatment of live stock, including a liquid-containing tank for the immersion of the lower portions of the animals, spraying devices for directing jets of fluid against those portions of the animals located above the level of the liquid in the tank, and means extending laterally beyond the tank for collecting the liquid splash which passes beyond substantially as described.

28. An animal spraying apparatus comprising an open runway, spraying devices for treating the animals while in said runway, means for delivering fluid to the spraying devices, and means extending laterally beyond the runway for collecting the liquid splash, substantially as described.

29. Apparatus for the treatment of animals, including a tank provided with an entrance and an exit for the animals, and spraying devices arranged above the liquid level of the tank, substantially as described, and means extending laterally beyond the tank for collecting the liquid splash.

30. Apparatus for the treatment of animals, comprising a tank provided with an entrance and an exit for the animals, spraying devices arranged above the liquid level of the tank, and means extending laterally beyond the tank for collecting the surplus liquid.

31. An animal spraying apparatus, comprising spraying devices arranged to direct jets of fluid against the animals, means for forcing such fluid through the spraying devices under suitable pressure, and pressure-reducing valves for regulating the pressure of the liquid delivered to the spraying devices, and means extending laterally beyond the spraying devices for collecting the liquid splash substantially as described.

32. In an apparatus for the treatment of animals, the combination of a tank provided with an entrance and an exit for the animals, spraying devices arranged above the liquid level of the tank, means for delivering fluid to the spraying devices under pressure, means extending laterally beyond the tank for collecting the surplus liquid, and means for returning collected liquid to the spraying devices, substantially as described.

In testimony whereof I affix my signature in presence of two witnesses.

FRANK C. GOFF.

Witnesses:
 DENA NELSON,
 F. MASUE MAYHEW.